Dec. 13, 1938.  W. B. FAGEOL  2,140,421

PNEUMATIC-TIRED HIGHWAY AND RAIL VEHICLE

Filed Nov. 14, 1933  5 Sheets-Sheet 1

Inventor
William B Fageol

By Strauch + Hoffman
Attorneys

Inventor
William B. Fageol

By Strauch + Hoffman
Attorneys

Dec. 13, 1938.   W. B. FAGEOL   2,140,421
PNEUMATIC-TIRED HIGHWAY AND RAIL VEHICLE
Filed Nov. 14, 1933.   5 Sheets-Sheet 3
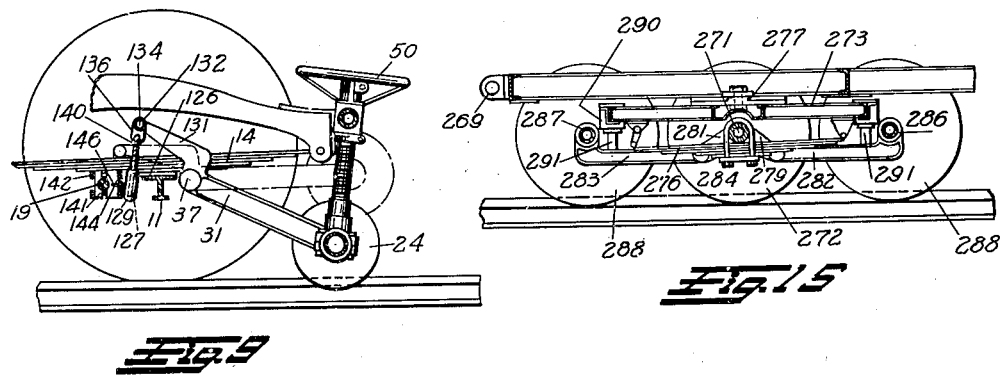
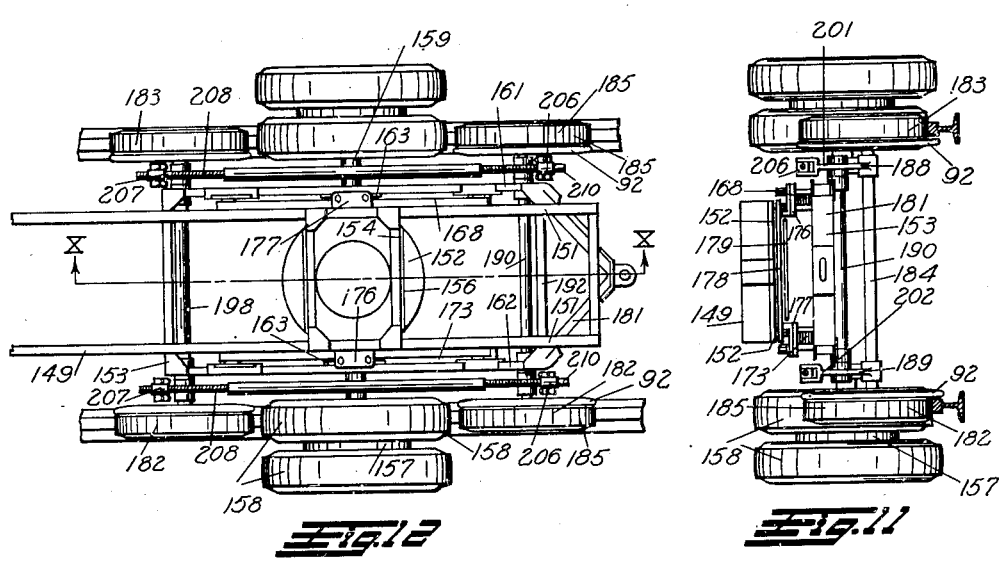
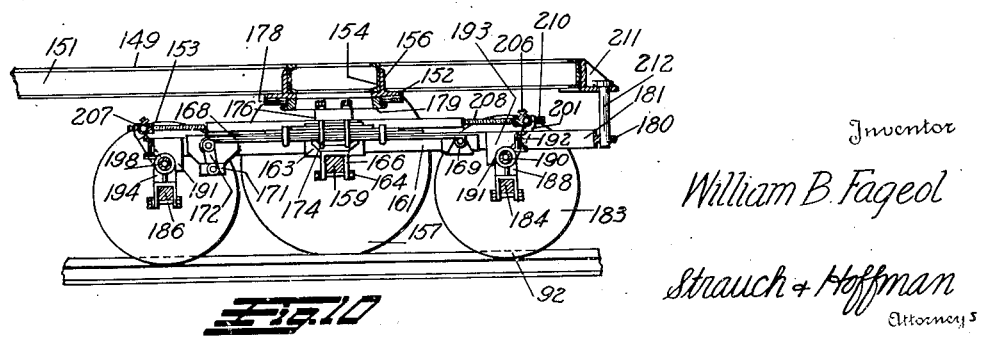

Dec. 13, 1938.  W. B. FAGEOL  2,140,421
PNEUMATIC-TIRED HIGHWAY AND RAIL VEHICLE
Filed Nov. 14, 1933  5 Sheets-Sheet 4
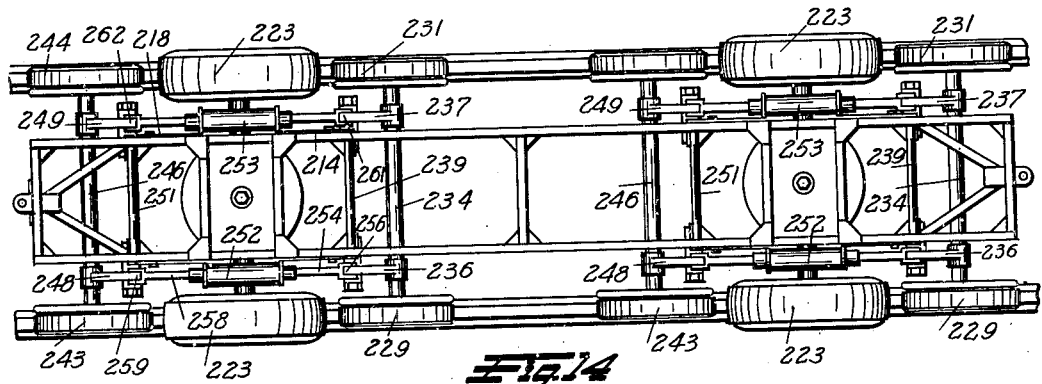
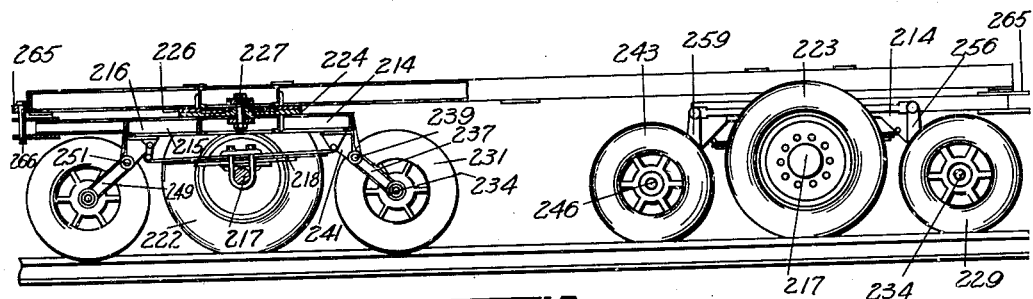
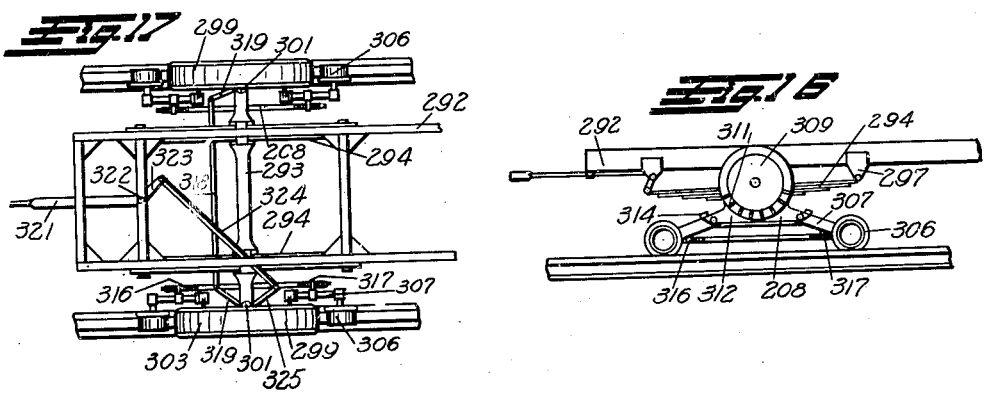
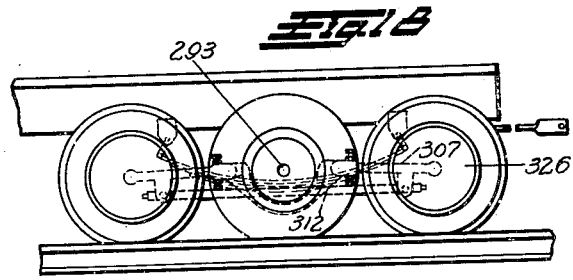
Inventor
William B. Fageol
Strauch + Hoffman
Attorneys Dec. 13, 1938.　　　W. B. FAGEOL　　　2,140,421
PNEUMATIC-TIRED HIGHWAY AND RAIL VEHICLE
Filed Nov. 14, 1933　　　5 Sheets-Sheet 5
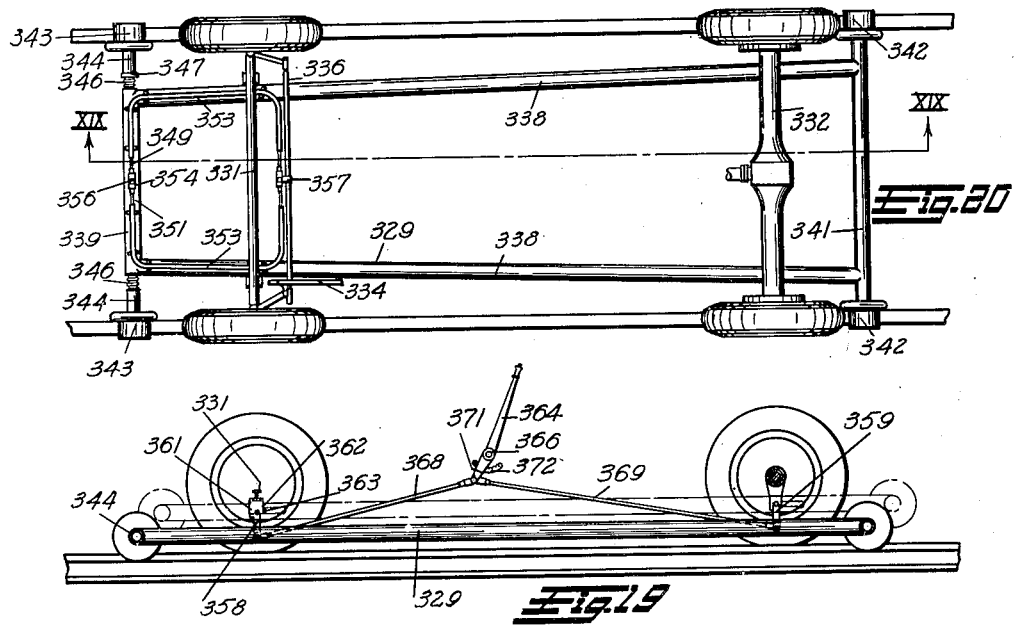
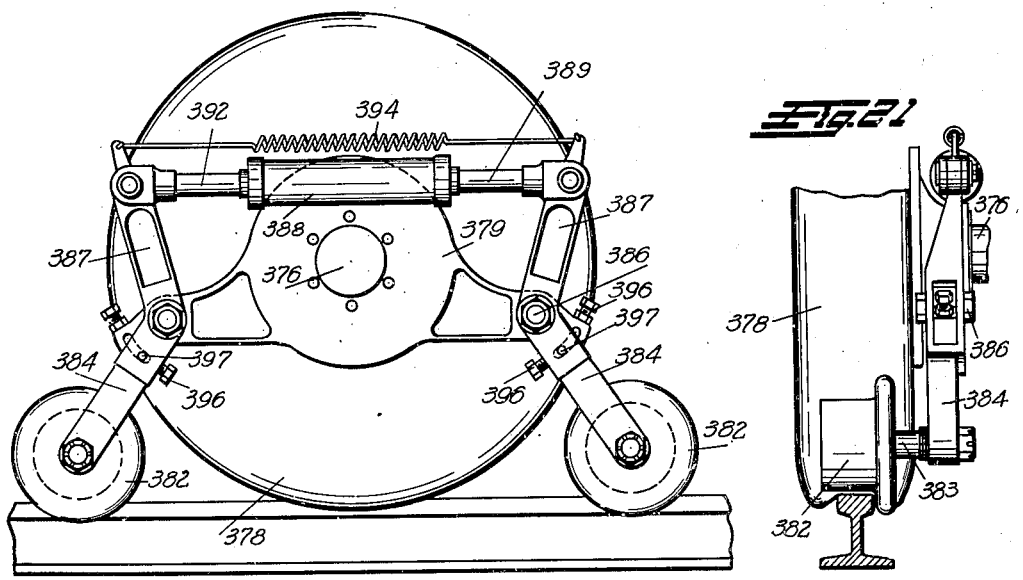
Inventor
William B. Fageol
By Strauch + Hoffman
Attorneys Patented Dec. 13, 1938

2,140,421

UNITED STATES PATENT OFFICE 2,140,421

PNEUMATIC-TIRED HIGHWAY AND RAIL VEHICLE

William B. Fageol, Kent, Ohio, assignor to Twin Coach Company, Kent, Ohio, a corporation of Delaware Application November 14, 1933, Serial No. 697,989

4 Claims. (Cl. 105—215)

My invention relates to vehicles of the kind equipped with cushioned tires and especially to vehicles so equipped embodying novel means for enabling them to be safely and efficiently operated over the tracks of existing railroads at relatively high speeds for haulage of freight and passengers.

The invention also relates to vehicles, both of the self propelled type and trailer units, equipped with pneumatic tires and provided with novel means to insure efficient operation over tracks of steam and electric railroads at substantially full load highway capacity.

Pneumatic tired convertible highway and rail vehicles of the prior art were incapable of efficient operation for the reason that the devices employed for guiding the vehicles on the rails were not adapted for safe and positive operation under heavy loads. Pneumatic tired vehicles of the prior art of relatively large capacity for rail operation were equipped with special tires and with rail guiding devices which could not be readily detached so that this class of prior vehicles was confined solely to rail operation. Highway operation with such prior art vehicles of relatively large capacity was practically impossible as the practices followed were largely steam railroad practices using a swiveling bogey track with all of the wheels in guiding engagement with the rails.

According to one phase of my invention to be disclosed hereinafter, I provide novel rail guiding means adjustable, when in operative rail guiding position, to most effectively guide the vehicle along track rails under load conditions varying from no load to the maximum load carrying capacity of the vehicle. By the present invention I also aim to provide novel rail guiding means adapted to bear a predetermined portion of the load in a novel manner when in operative rail guiding position. I also contemplate the provision of means for making the adjustment of the portion of the load to be borne by the rail guiding means either manually or automatically and, when desired, arranging the adjusting means to move the rail guiding means to an inoperative position permitting operation of the vehicle over highways.

Accordingly, a primary object of the present invention is to provide novel means for guiding a vehicle equipped with cushion tires on railroad tracks, the said means being adjustable when in rail guiding position to insure proper guiding action of the vehicle under different conditions of load.

A still further object of the present invention is to provide novel means for guiding a vehicle equipped with pneumatic tires on railroad tracks, the said means being adjustable to bear a predetermined portion of the load when the vehicle is being operated along tracks.

A still further object of the present invention is to provide novel means for guiding a pneumatically tired vehicle along the rails of a track, the said means being manually or automatically adjustable to and from rail guiding or non-rail guiding position.

A further and related object of the present invention is to provide novel means for guiding a pneumatically tired vehicle along the rails of a track, the said means comprising novel pneumatically tired guide wheels supporting a predetermined portion of the vehicle load.

In the accomplishment of the objects of my invention set forth above, I have found that a road vehicle provided with the usual springs for absorbing road shocks due to the unevenness of road surfaces may be operated on the compartively smooth rails of a track with the springs locked so as to be ineffective. The locking of the springs permits the position of the rail guiding means to be predetermined when the vehicle is to be operated on the rails. This feature of my invention insures that the guiding means will exercise their proper function for all conditions of load, and where the novel pneumatically tired guide wheels of this invention are to be used, it enables the load to be carried by the rail guide wheels to be predetermined. In this latter case, the vehicle equipped with the novel guide wheels is capable of carrying full load when operating either as a road vehicle or a rail vehicle.

Accordingly, it is a further object of my invention to provide novel means for rendering the usual springs of a road vehicle inoperative when the vehicle is prepared for operation on railroad tracks.

A still further object of my invention is to provide novel apparatus for guiding a road vehicle on the rails of a railroad track embodying rail guide wheels adjustably carried by a portion of said apparatus which serves to position the body of said vehicle at a predetermined position above the axis of the road wheels when the apparatus is adjusted for rail operation.

A still further object of the present invention is to provide novel apparatus for guiding a road vehicle on the rails of a railroad track embodying pneumatically tired rail guide wheels, novel in form, for supporting a predetermined portion of the vehicle load carried by an adjustable portion of said apparatus.

Still another object of the present invention is to provide novel means for positioning the rail guiding wheels of this invention manually or automatically to provide for rapidly changing from highway to rail operation in the shortest possible time.

Further objects of my invention will appear in the following disclosure of preferred forms of my invention, and are defined by the terms of the appended claims.

Referring to the drawings in which like reference characters indicate like parts:

Figure 9 is a sectional elevation of the apparatus of Figure 1 illustrating a modified form of steering gear lock.

Figure 10 is a sectional elevation taken approximately on line X—X of Figure 12 and illustrating the invention as embodied in a trailer unit, one only of the substantially identical ends of the trailer being shown.

Figures 11 and 12 are end and top plan views respectively of the trailer unit of Figure 10.

Figure 13 is an elevational view partially in section of further modifications of the invention embodied in a trailer unit.

Figure 14 is a top plan view of the trailer of Figure 13.

Figure 15 is a sectional elevation of one end of still another modification of the invention embodied in a trailer unit designed exclusively for rail travel.

Figure 16 is an elevational view with certain of the parts omitted for the sake of clearness, illustrating the invention as embodied in a trailer unit provided with steerable wheels of the automotive type.

Figure 17 is a top plan view of the trailer of Figure 16.

Figure 18 is an elevation view of one end of a modified form of trailer vehicle.

Figure 19 is a sectional elevation taken substantially on line XIX—XIX of Figure 20, and illustrating rail guiding means in the form of a supplemental truck for attachment to a conventional motor vehicle, only a portion of the latter being shown.

Figure 20 is a top plan view of the truck illustrated by Figure 19.

Figure 21 is a fragmentary end view of a vehicle wheel and axle equipped with a fluid operated guiding attachment.

Figure 22 is an elevational view of the apparatus as viewed from the right hand side of Figure 21.

Figure 4:
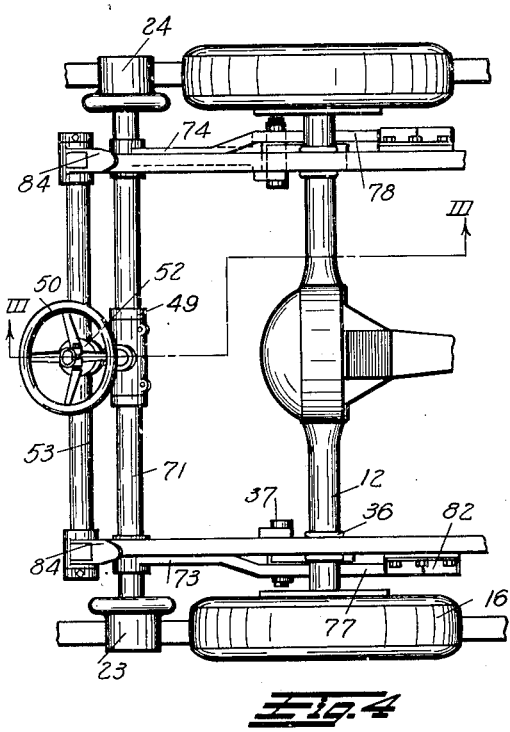
Figure 4 is a plan view of the apparatus of Figure 3.

The invention will be hereinafter described in connection with pneumatic tired passenger or freight vehicles either of the self-propelled or trailer type. Where electrical operation of self-propelled highway and rail vehicles is employed, a return connection for the propulsion current when operating an electrified tracks may be provided by the novel means disclosed in my copending application Serial No. 489,208 filed October 16, 1930, now Patent No. 1,972,333 dated September 4, 1934, or the novel means illustrated and described in my copending application Serial No. 613,751 filed May 16, 1932, now Patent No. 2,027,684 dated January 14, 1936. Either of these arrangements may be used for operating existing track circuit signals and train control apparatus.

Referring to the drawings in detail, Figures 1 to 4 thereof illustrate one embodiment of my invention in a preferred form for operation in connection with the front and rear road wheels of a vehicle. Reference character 9 indicates the side members of the frame of the road vehicle 10, only a part of which is shown as it forms no part of my present invention. The vehicle 10 is spring supported on the front and rear axles 11 and 12 by the usual vehicle springs 14 to compensate for unevenness in the highway surface over which the vehicle is to be operated. The front axle 11 illustrated in Figures 1 and 2 of the drawings is a "dead" or non-driving axle and axle 12 illustrated in Figures 3 and 4 of the drawings is a driving axle in the vehicle selected for the purpose of illustrating my invention. The axles 11 and 12 are carried by road wheels 15 fitted with resilient tires 16. Resilient tires 16 are preferably of the pneumatic type having the necessary load carrying capacity for operation with the vehicle 10.

The wheels 15 on axle 11 are adapted to be steered by a conventional steering gear (not shown) which operates to turn wheels 15 about the axes of king pins 17 through steering link 18 and steering cross rod 19. The novel rail guiding apparatus shown on Figures 1 and 2 of the drawings is designed for operation in conjunction with the steering road wheels of the vehicle and differs slightly from the apparatus shown on Figures 3 and 4 which cooperates with the rear wheels.

Figure 2:
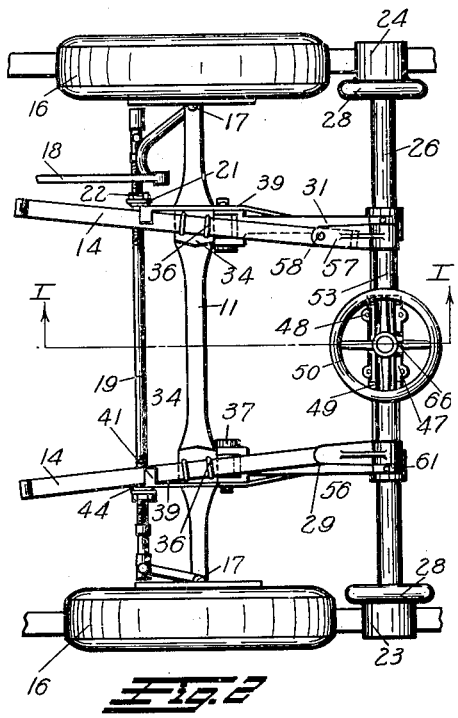
Figure 2 is a plan view of the apparatus of Figure 1.
Figure 1:
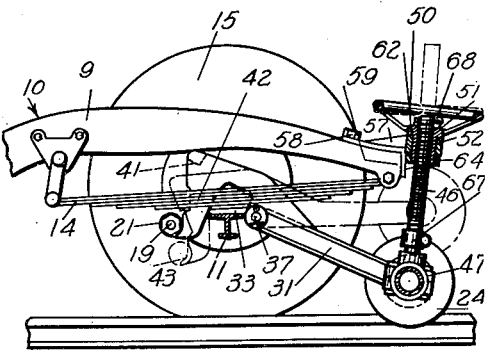
Figure 1 is a sectional view taken approximately on line I—I of Figure 2 and illustrating one form of the vehicle rail guiding means of the present invention in rail guiding position adapted for cooperation with the steering road wheels of a conventional vehicle, only a part of the latter being shown. The non-guiding position of the apparatus is illustrated by dot and dash lines.

Referring now to Figures 1 and 2 of the drawings for a detailed description thereof, adjustable stops 21 are threadedly engaged with the cross rod 19 and cooperate with the guiding apparatus in a manner to be described to lock the steering gear in the straight ahead position for rail operation. The stops 21 are held in adjusted position by any suitable means, for example lock nuts 22 which are threadedly received on cross rod 19.

A pair of flanged guide wheels 23 and 24 rotatably carried by suitable antifriction bearings on an axle 26 serves to guide the vehicle on the rails of a track. These guide wheels in the embodiment of the invention illustrated by Figures 1 to 4 exercise their guiding function by intermittent contact of flanges 28 with the inside of the rail heads, and the treads are normally out of contact with the running surface of the rails. Where moderate loads are to be carried by the vehicle, this arrangement is economical and the guide wheels 23 and 24 will have an indefinitely long life as they are not called upon to carry any portion of the load except in the event of deflation of one or the other of the tires 16. The guide wheels are preferably of sufficient width to permit of the inner faces contacting with guard rails at switches, crossings and other special work.

The axle 26 is rigidly connected to the free ends of a pair of swingable arms 29 and 31, each of which is pivotally mounted on brackets 33 which are conveniently secured to the vehicle axle 11. Assembly of the brackets 33 with the axle 11 is facilitated by mounting them on the spring pads 34 of the axle beneath the springs 14, and clamping them in position by means of the U-bolts 36 which secure the springs. Each of the arms 29 and 31 is divided at its point of pivotal connection with the bracket 33 to embrace the bracket and pin 37 extends through aligned apertures in both parts of the arm and an eye in the bracket. The pin 37 may be retained in position in any suitable manner, for example by a washer and cotter key.

An extension 39 on each of the arms 29 and 31 lies outside of the vehicle springs 14 and is provided with a frame supporting lug 41 which engages beneath the outside member 9 of the vehicle frame to support the frame independently of the springs 14 when the guide wheels 23 and 24 are lowered to rail guiding position indicated by the full lines on Figure 1 in the manner to be described in detail. Each extension 39 also includes a tailpiece 42, the edge 43 of which is adapted for locking engagement with a groove 44 formed in the adjustable stops 21 previously described, to prevent steering movement of the road wheels 15 on the axle 11.

The guide wheel axle 26, supported for swinging movement by the arms 29 and 31 in the manner described, is moved to and from the rail operating position indicated by the full lines on Figure 1 by means of a screw threaded stem 46. The threaded stem is secured in one branch of a T-shaped fitting 47 which is rotatably mounted over the guide wheel axle 26 between the arms 29 and 31. To facilitate ready assembly of the fitting 47 on the axle 26, the tubular body portion which fits over the axle is preferably divided in two parts which may be joined together in a suitable manner as by bolts 48 after assembly of the body portion to the axle. Collars 49 secured to the axle 26 by set screws or any other suitable fastening means prevent lateral movement of the fitting 47.

A handwheel 50 having an internally threaded hub 51 cooperates with the threads of stem 46 and is journalled for rotation in a ring shaped portion 52 of a cross bar 53 formed of metal tubing or other suitable material. The cross bar 53 is rotatably carried at each end by bearing apertures in a pair of bracket members 56 and 57. These bracket members are preferably formed to fit over the forward end of the vehicle side frame members 9 and in the example chosen for the illustration of my invention, the bracket members are connected by bolts 58 to the forward bumper supports 59. A collar 61 is provided on each end of the bar 53 secured thereto by set screws or other suitable means to prevent endwise movements of the bar in the brackets 56 and 57.

The downwardly directed end thrust on handwheel 50 as it is turned to raise the guide wheel axle 26 from rail operating position is taken by the shoulder 62 which seats against the top face of the ring shaped portion 52 of the cross bar. Upwardly directed end thrusts on the handwheel are taken by the upper face of a split collar 64 which is threadedly received over a slightly reduced portion of the hub 51. The collar 64 is secured against accidental removal by means of a clamping bolt and nut 66. Collars 67 and 68 if desired may be clamped to the threaded stem 46 to define the extreme limits of movement of the stem and the guide wheel axle 26.

From the foregoing detailed description of the rail guiding apparatus adapted for use in conjunction with the steering road wheels of the vehicle, it will be seen that as the guide wheels 23 and 24 are lowered to rail guiding position by turning the hand wheel 50, the arms 29 and 31 will move about the pivot pins 37 in a clockwise direction. Extensions 39 will be raised so that lugs 41 engage beneath the frame members 9 to relieve the vehicle springs 14 of the weight of the vehicle body and its load. This causes the vehicle frame to stand at a fixed distance above the vehicle axle 11 and causes the guide wheels 23 and 24 to be constantly positioned with a fixed clearance between their treads and the tops of the rails. At this time, the edges 43 of the tail pieces 42 will be in locking engagement with the stops 21 to prevent steering movement of the forward road wheels 11 so that guiding of the vehicle will be accomplished solely by intermittent contact of the flanges 28 of the guide wheels with the inside surfaces of the rail heads. It will be understood that the guide wheels may be raised and lowered by means of fluid pressure or vacuum applied through suitable instrumentalities.

Figure 3:
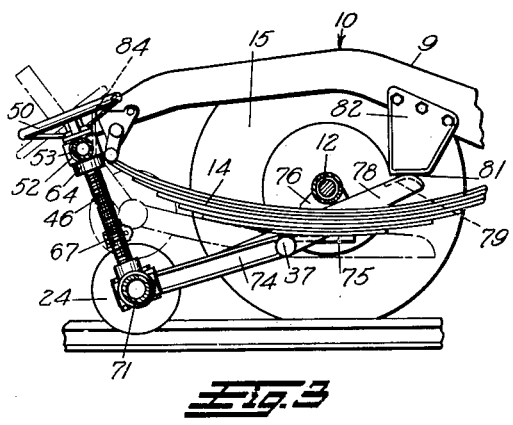
Figure 3 is a view in section on line III—III of Figure 4 illustrating the novel apparatus applied for cooperation with the rear wheels of a conventional vehicle.

Figures 3 and 4 of the drawings show the novel guiding apparatus as arranged for use on the rear of the vehicle 10 and differs but slightly from that described in connection with Figures 1 and 2. It will be understood that the apparatus illustrated in Figures 1 and 2 may be used for cooperation with both the front and rear wheels of a vehicle which is to be adapted for highway and rail operation if the vehicle is specially constructed so as to be steerable at both ends. Also, the guiding apparatus of Figures 3 and 4 may be used at both ends of a vehicle where the device which steers the road wheels of the vehicle is provided with a separate lock to retain the steering apparatus in the straight ahead position.

The rear axle 12 of the vehicle 10, as previously mentioned, is a driving axle and like axle 11 supports the vehicle 10 on the usual vehicle springs 14. An axle 71 similar to axle 26 carries the flanged guide wheels 23 and 24 which cooperate with the road wheels 15 in the manner previously described in connection with Figures 1 and 2.

The axle 71 is swingably carried by arms 73 and 74 which are pivotally mounted on brackets 75 which serve the same purpose as brackets 33 and are but slightly different in structure. The brackets 75 are secured to the axle 12 beneath the springs 14 and the spring seats 76 by the axle securing bolts 36. An extension 77 is provided on arm 73 and lies on the outside of the spring 14 and a like extension 78 is provided on arm 74. A lug 79 is formed on the free ends of each extension 77 and 78 and these lugs cooperate with the flanged faces 81 of members 82 which are secured to the side frame members 9 in any suitable manner. Upon movement of the guide wheel axle 71 to rail guiding position, the arms 73 and 74 turn about the pivot pins 37 in the manner already described in connection with Figure 1. During this operation the extended portions 77 and 78 of the arms 73 and 74 are raised to bring the lugs 79 into supporting contact with the flanges 81 of the members 82.

The handwheel 50 cooperates with the threaded stem 46 to move the guide wheel axle 71 to and from highway or rail operating position. The parts in association with the handwheel 50 which moves the rear guide wheel 71 are the same in structure and arrangement as those already described in connection with Figures 1 and 2, therefore the detailed description of these parts will not be repeated. Brackets 84 which correspond to the brackets 56 and 57 are formed to suit the contour of the rear end of the frame members 9 of the vehicle 10 and pivotally support each end of the cross bar 53.

Vehicle 10, equipped with novel rail guiding apparatus just described may be operated at will over highways in the usual manner without interference when the guide wheels on the axles 26 and 71 are raised to the position indicated by the dot and dash lines on Figures 1 and 3. When the vehicle is to be operated on the rails of a track, the steering gear is brought to the straight ahead position with the road wheels resting on the track. The setting of the steering gear may be facilitated if desired by providing a suitable mark on the steering wheel for registry with a similar mark on a stationary part of the steering apparatus. Hand wheels 50 are turned to lower the rail guide wheels to guiding position with their treads clear of the running surface of the rails. To aid in properly positioning the guide wheels, the inside of the flanges may be marked with a circular line which when it is brought tangent to the top of the rail will indicate proper clearance for the treads of the guide wheels. As the guide wheels are lowered, the load on the springs is relieved as previously explained holding the body of the vehicle at a substantially fixed distance above the axles 11 and 12 with the result that the guide wheels clear the rails by an amount suitable for proper operation at all times. Movement of the guide wheels toward and from rail guiding position may be had by fluid or vacuum operated means as previously stated, and when desired, simultaneous operation of the guide wheels at the front and rear of the vehicle may be secured by suitable control means for the operating mechanism of both sets of guide wheels.

Figure 5:
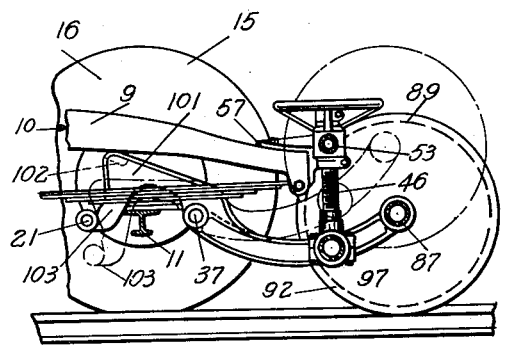
Figure 5 is a view in section on line V—V of Figure 6 of a modified form of the rail guiding means of the present invention employing a novel form of guide wheel.

Figures 5 to 8 of the drawings illustrate a modified form of the embodiment just described. This form of the present invention is suitable for heavier loads and preferably employs a novel form of pneumatically tired rail guide wheel which in addition to exercising a guiding function, bears a predetermined portion of the vehicle load. Metallic guide wheels of the type previously described, modified for load bearing contact with the rails may be employed, if desired. Referring to Figures 5 to 8, in detail, it will be seen that reference numeral 9 indicates the side frame members of a vehicle, similar to vehicle 10 of Figure 1, provided with axles 11 and 12 and road wheels 15 equipped with pneumatic tires 16. Figure 5 is an elevational view of the axle 11 and its associated parts with the guiding apparatus shown in rail guiding position by full lines.

The conventional steering connection (Figure 6) includes the steering link 18 and the steering cross rod 19 carrying the adjustable stops 21. An axle 87 similar in function to the axle 26, rotatably carries a pair of guide wheels 88 and 89 by any suitable type of antifriction bearings. The guide wheels are provided with pneumatic tires 91 preferably of the kind designed particularly for rail use. A guiding flange 92 is secured to each of the guide wheels and projects beyond the tread of the tire 91 for guiding contact with the inside of the rail head.

A pair of swingable arms 94 and 96 carries the axle 87 for movement to and from rail guiding position under control of the hand wheel 50. The hand wheel 50 is rotatably carried by the cross bar 53 journalled in the brackets 57 and the threaded stem 46 is rotatably secured to the cross bar 97 by the fitting 47 in a manner similar to its connection with the axle 26 of Figure 1. The swingable arms 94 and 96 are each pivotally mounted by means of pins 37 on the brackets 99 which are secured to the axle 11 beneath springs 14. The spring securing U-bolts 36 serve to clamp the brackets 99 in position.

An extended portion 101 of each of the arms 94 and 96 lies outside of the vehicle springs 14 and bears a frame supporting lug 102 at its end for engagement beneath the frame member 9 of the vehicle body for relieving the load on the springs as the guide wheels are lowered to rail guiding position. A tail piece 103 on each of the extended portions 101 of the arms cooperates with stops 21 to lock the steering road wheels 15 of the vehicle in straight ahead position.

Figure 8:
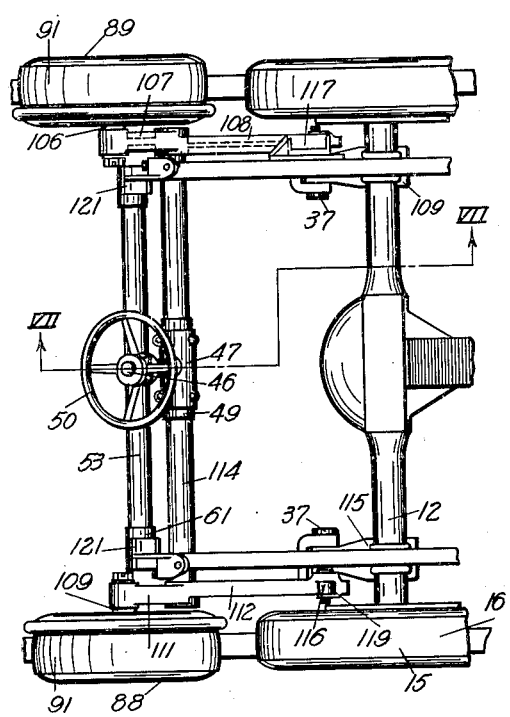
Figure 8 is a plan view of the apparatus of Figure 7.
Figure 7:
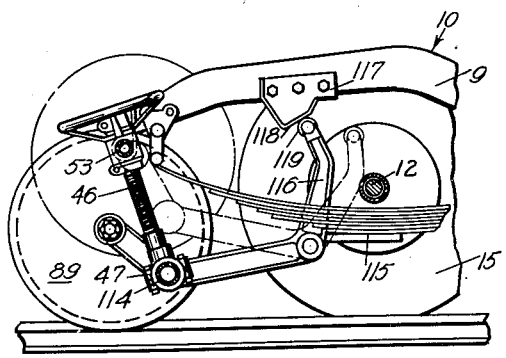
Figure 7 is a sectional view taken on line VII—VII of Figure 8 illustrating the apparatus employing the novel form of guide wheel in conjunction with the rear wheels of a vehicle.

Figures 7 and 8 of the drawings show the guiding apparatus employing the novel pneumatic tired rail guiding wheels 88 and 89 arranged for operation in connection with the rear road wheels 15 of the vehicle 10. The guide wheel 89 is journalled on a stub axle 106 carried by an extended portion 107 of a swingably mounted arm 108. Guide wheel 88 is likewise journalled on a stub axle 109 carried by an extended portion 111 of an arm 112 which is parallel to the arm 108. A cross bar 114 which corresponds in function to the bar 97 shown on Figure 5 is secured at each end in eyes formed in the arms at the intersection of the extended portions 107 and 111 with the principal portions of the arms.

The swingable structure comprising the arms 108 and 112 is pivotally carried by the pins 37 on brackets 115 secured adjacent each end of the axle 12 in the manner described in connection with the brackets 75 of Figure 3.

To relieve the vehicle springs 14 of the load imposed by the weight of the vehicle body and its contents, the arms 108 and 112 are provided with unitary extensions 116 lying on the outside of the vehicle springs 14. These extensions project upwardly to the rear of the axle 12 to provide clearance for the necessary movements of the arms 108 and 112. Supporting members 117 provided with an angular cam face 118 are secured to each of the frame members 9. A roller 119 is preferably mounted at the free end of each of the extensions 116 to cooperate with the sloping cam surface on the supporting member 117. As the guide wheels are lowered to their supporting and rail guiding position, the rollers 119 on extensions 116 move to the left as viewed on Figure 7 to bear against the cam surfaces 118 of the members 117 to support the body of the vehicle independently of the springs 14. A relatively slight movement of the extensions 116 will serve to properly position the body of the vehicle.

The T-shaped fitting 47 which provides for connection of the screw threaded post 46 to the swingable structure is rotatably received over the cross bar 114 between the collars 49. The hand wheel 50 cooperating with threaded post 46 is rotatably carried by the cross bar 53 journalled at its ends in the brackets 121. The brackets 121 are similar in structure and function to the brackets 84 of Figure 3.

The operation of the modified form of the invention just described will be readily understood from the description of the method of operation of the embodiment of Figures 1 to 4. The pneumatically tired guide wheels 88 and 89 are adapted to bear a portion of the total load represented by the loaded vehicle 10 and for this purpose the hand wheels 50 are adjusted until the tires 91 and each set of guide wheels is in contact with the rails. In the event of accidental deflation of any of the tires 16 or 91 the remaining tires will carry the load until the damage can be repaired. Emergency highway operation for short distances may also be had by lowering the tires 91 to the surface of the roadway. The load bearing capacity of the tires 16 when the vehicle 10 is operating over highways in the usual manner is in excess of their capacity on the rails of a track due to the fact that the contact area of the treads is greatly diminished when the tires are on the rail. The pneumatic tired guide wheels offset this decrease in load bearing capacity by carrying a portion of the load during rail operation, accomplishing this highly desirable function in a safe and efficient manner. The tires 91 cushion the slight shocks caused by unevenness in the rail joints and interruptions in the continuous running surface of the track at switches and special work. This entirely eliminates the necessity for reliance on the cushioning effect of the vehicle springs 14 which are rendered ineffective by engagement of the extensions 116 of the arms 108 and 112 with the members 117 to proportion the load.

As previously explained in connection with Figures 1 to 4, the guide wheels may be moved to and from rail guiding position by an automatic means deriving power from a source of fluid pressure or engine vacuum.

Figure 9 of the drawings illustrates a slightly modified form of the steering gear locking means of Figures 1 and 5. The arrangement of the parts is substantially like that previously described in connection with these figures. Reference character 31 indicates the left hand guide wheel carrying arm of the pair of arms 29 and 31, which is pivotally connected to the bracket 126, corresponding to the bracket 33 of Figure 1, by means of pivot pin 37. The bracket 126 is provided with a downwardly turned portion 127 which carries an elbow shaped guide tube 129.

The arm 31 and likewise the corresponding arm 29 has two extensions 131 which lie on each side of the vehicle spring 14. Frame engaging rollers 132 are rotatably carried on each guide wheel carrying arm by means of pivot pins 134 in aligned apertures in the extensions 131. A link 136 is pivotally connected to each pin 134 on the side of the extensions 131 nearest the center of the vehicle.

The steering cross rod 19 is secured against movement when rail guide wheels 23 and 24 are lowered to rail guiding position by means of cables 140 or other suitable flexible strands. A three part clamping member 141 is secured by means of clamping bolts 142 to the steering cross rod 19 substantially at the center of the vehicle. A rod 144 is clamped between two parts of the clamping member 141 and extends on each side thereof. The ends of the rod 144 are formed to provide cable securing eyes 146. As shown by Figure 9, one end of the left hand cable 140 is connected at one end to the link 136 and at the other end to one of the eyes 146 on the rod 144. The right hand cable (not shown) is connected in a similar manner to the link 136 on the end of the extended portions of arm 29 and to the eye 146 at the opposite end of the bar 144. The cables are threaded through the guide tubes 129.

In operation of the modified form of the invention just described, hand wheel 50 is turned to lower the rail guide wheels which causes the links 136 to be raised until the cables 140 are taut and exert a pull in opposite directions on the steering cross rod 19. Adjustment of the position of the steering rod 19 when the cables are drawn up may be had by loosening the clamping bolts 142 and moving the rod 19 within the clamping member or moving the clamping member bodily along the steering cross rod 19.

Figures 10, 11 and 12 of the drawings illustrate the invention embodied in a trailer unit preferably employing the novel form of pneumatically tired guide wheels previously described. This embodiment of the invention is adapted for highway and rail operation whereby relatively heavy loads may be transported over both highways and railroad tracks by trains of vehicles. The body supporting frame 149 of the trailer vehicle is constructed of suitable longitudinal framing members or sills 151. A center bearing member 152 adjacent each end of the frame 149 provides means for supporting the frame on the swivelling trucks 153 in a manner to be described. The member 152 is retained in position by framing members 154 and integral flanges 156.

Pneumatic tired road wheels 157 which may be equipped with dual tires 158 are journalled for rotation on the main axle 159. This axle is rigidly connected to the truck side frame members 161 and 162 by means of suitable brackets 163. A bolt 164 received in aligned apertures in a pair of axle receiving guides or pedestals 166 integral with the bracket 163 retains the axle 159 in position. A spring 168 is secured to the side frame member 161 of the truck by means of a bracket member 169 and a shackle receiving bracket member 171. A shackle 172 provides for relative longitudinal movement of one end of the spring as it flexes. A similar spring 173 is connected in the manner just described to the truck side frame member 162 and springs 168 and 173 are connected by means of U-bolts 174 to integral ears 176 and 177 of a truck center bearing member 178.

The center bearing member 152 on the vehicle frame rests on the truck bearing member 178 and provides for movement of the truck relative to the vehicle frame to facilitate negotiation of curves in both highway and rail travel. The bearing members 152 and 178 are circular in form and contact over an area of large diameter which stabilizes the frame 149 and the vehicle body and prevents side sway. A retaining member 179 prevents separation of the vehicle frame 149 and the trucks 153 and provides for retaining a quantity of suitable lubricant adjacent the bearing surfaces of the members 152 and 178.

A coupling member 180 is secured to each truck 153 by members 181 and provides for connection of the trailer vehicle in a train of similar vehicles or to a tractor or other motor vehicle.

A pair of pneumatically tired flanged guide wheels 182 and 183 are rotatably carried on suitable antifriction bearings by an axle 184 positioned forwardly of the main axle 159. The pneumatic tires 185 are preferably similar in type to tires 91 described in connection with Figures 5 to 8 of the drawings and a guiding flange 92 is secured to each of the guide wheels. An axle 186 positioned to the rear of the main axle also carries a pair of pneumatically tired guide wheels 182 and 183.

The forward guiding axle 184 is carried by a pair of swingable arms 188 and 189 journalled on a cross shaft 190 which is secured in brackets 191. The brackets 191 are secured to the truck side frame members 161 and 162 adjacent the end member 192 by means of an integral angular portion 193. The rear guiding axle 186 is carried in a similar manner by swingable arms similar to 188 and 189 and secured to a cross shaft 198 rotatably carried by brackets 191 situated to the rear of the main axle 159.

The arms 188 and 189 are extended upwardly beyond the cross shaft 190, the extensions being designated by reference characters 201 and 202 respectively. The arms on cross shaft 198 are also provided with extended portions similar to 201 and 202. The extension 201 on cross shaft 190 and its counterpart on cross shaft 198 are bifurcated and pivotally carry threaded trunnions 206 and 207 to receive the threaded ends of a rod 208. Each end of the rod 208 is provided with threads of opposite pitch. Trunnions 206 and 207 have oppositely threaded bores to cooperate with the threaded portions of the rod 208 so that upon turning of the rod, extension 201 and its counterpart on cross shaft 198 are drawn together or spread apart in accordance with rotation in either direction of the rod 208. In a similar manner, extension 202 and its counterpart on cross shaft 198 are provided with trunnions 206 and 207 to cooperate with another threaded rod 208. Each rod 208 is provided with a square end 210 for engagement with a wrench or other suitable tool.

The trailer just described is capable of operation on either highways or on the rails of a track. When the trailer is towed behind a truck or tractor on the highway, the front truck is left free to swivel and the rear truck is preferably locked. A coupler locking member 211 is provided at each end of the vehicle frame for the purpose of preventing swivelling movements of the trucks when desired. A locking pin 212 adapted for engagement in apertures in the locking member and the coupler 180 with the truck and vehicle center lines coinciding prevents swivelling movements of the truck.

For rail travel, both of the trucks 153 of the trailer vehicle are left free to swivel insuring that the guiding flanges will keep the trucks on the rails when negotiating curves. Also, in operation of the trailer vehicles in trains on both the highway and the rails of a track the trucks are left free to swivel. For highway operation in trains, the trailer vehicles just described are preferably provided with intersteering connections between the road wheel supported trucks.

For highway travel, the guide wheels on the opposite side of each of the trucks 153 are raised by turning the rods 208 to draw the extensions on the swingably supported arms inwardly toward the center of the truck. The axles 184 and 186, carrying the pneumatic tired guide wheels, will be swung upwardly and outwardly to raise the guide wheels entirely clear of the rolling surface of the road wheels 157. The dual tires 158 on the road wheels bear the full load of the vehicle and shocks due to unevenness in the surface of the roadway are cushioned by springs 168 and 173.

For rail travel, the rods 208 are turned until the pneumatic tires 185 of the guide wheels are in contact with the rails and bearing a predetermined portion of the load. As previously stated in connection with the operation of the embodiment of the invention illustrated by Figures 5 to 8 of the drawings, the pneumatic tired guide wheels offset the decrease in load bearing capacity of the road wheel tires. One only of each set of dual tires 158 is in contact with the track, the remaining tire of the set lying outside of the rails of the track where it does not interfere in any way with the negotiation of switches or other special work as it is supported substantially at the level of the tops of the rail heads. In the event of accidental deflation of any of the tires during rail operation, the remaining tires in contact with the rails will serve to bear the load. For emergency highway operation with a damaged road wheel tire, the tires 185 may be employed to permit of emergency operation for short distances.

The guide wheels of each truck if desired, may be moved to and from rail guiding position by means of an arrangement similar to that just described, but involving only a single threaded rod 208. To accomplish this conveniently, the cross shafts 190 and 198 may be rotatably mounted in the brackets 191. The guide wheel carrying arms are secured to the cross shafts for rotation therewith. The single threaded rod 208 then cooperates at each threaded end with a threaded trunnion on an arm secured to impart rotation to each of the cross shafts 190 and 198.

Figures 13 and 14 are of the drawings illustrate a further modification of the invention embodied in a trailer unit similar to that illustrated by Figures 10 to 12. The novel pneumatic tired guide wheels previously described are preferably employed and are retractably mounted to permit alternate highway and rail operation of the vehicle.

Referring to Figure 14, reference character 214 indicates a swivelling truck, the frame 216 of which is spring supported on the axle 217 by means of springs 218 and 220. The springs are connected to the truck frame by means of brackets secured thereon in any suitable manner. Road wheels, 222 equipped with pneumatic tires 223, are journalled for rotation on the axle 217.

The swivelling truck 214 just described supports one end of the vehicle frame by means of a swivelling connection comprising the truck center bearing 224 and the body center bearing 226. A king bolt 227 positioned in aligned apertures in each of these center bearings connects the truck to the vehicle frame and permits relative movement as the vehicle follows the curves encountered in highway and rail operation. The opposite end of the vehicle frame 221 is supported in a similar manner by another swivelling truck 214.

The pneumatic tired flanged guide wheels 229 and 231 carried forwardly of the main axle 217 are suitably journalled on a guiding axle 234.

This guiding axle is carried by a pair of swingable arms 236 and 237 which are journalled for rotation adjacent the ends of a cross shaft 239. The cross shaft 239 is carried by brackets 241 secured at each side of the spring supported truck frame 216. The rear guide wheels 243 and 244 are journalled on a guiding axle 246 carried by swingable arms 248 and 249 rotatably mounted on a cross shaft 251, similar in detail to the shaft 239.

The guide wheels are moved to and from rail guiding position by fluid operated means which in the embodiment shown, comprise double acting fluid cylinders 252 and 253. A rod 254, rigidly connected to one end of the cylinder 252, is pivotally connected to an upwardly extending portion 256 of the axle carrying arm 248. A piston rod 258 extends through a suitable packing gland in the cylinder and is connected to a sliding piston adapted to be moved to the left as viewed on Figure 14 by admission of fluid under pressure at one end of the cylinder. Admission of fluid to the opposite end of the cylinder results in movement of the piston and the rod 258 in the opposite direction. The piston rod is pivotally connected at its free end to an upwardly extending portion 259 of the axle carrying arm 248. The fluid cylinder 253 is operatively connected in a like manner to extended portions 261 and 262 of the arms 237 and 249.

Upon admission of fluid under pressure to the end of the cylinder 252 nearest guide wheel 229, the extensions 256 and 259 are spread apart and likewise upon admission of fluid to the corresponding end of cylinder 253 the extensions 261 and 262 are spread. The guide wheels are thus lowered to rail guiding position. Admission of fluid to the opposite end of the cylinders draws the extensions together raising the guide wheels from the rail. Equal pressures are preferably maintained in both of the cylinders.

It will be understood that the guide wheels may be raised when fluid is exhausted from the cylinders by a suitable spring operatively connected to the extended portions of the guide wheel carrying arms as illustrated on Figures 21 and 22 of the drawings. The lifting springs may be installed within the cylinders to act directly on the piston rods.

A single cylinder will serve to raise and lower the guide wheels by interconnection of the cylinder and piston rod to arms secured to impart rotation to the cross shafts 239 and 251 journalled for this purpose in the brackets 241, the guide wheel axle carrying arms being secured to the cross shafts for rotation therewith.

The trailer of Figures 13 and 14 may be operated with equal facility on either the rails of a track or upon the highway substantially in the manner described in connection with Figures 10 to 12. Coupler locking members 265 and locking pins 266 provide for highway operation in the manner described in connection with the trailer vehicle of Figure 10.

For rail operation, the rail wheels of each truck are held in contact with the rails by a predetermined fluid pressure which may be maintained by any known form of pressure regulator. This predetermined pressure will impose the carrying capacity of the rail guide wheels and tires on the rails, maintaining and equalizing the load on these wheels. The main wheels of each truck are thus relieved of a substantial portion of the load.

For highway operation, the rail guide wheels are raised by fluid pressure or spring tension in the manner previously described. It will be understood that the trailer vehicle will be provided with suitable fluid conduits to conduct fluid under pressure to the cylinders 252 and 253. Flexible end connections of any desired type may be used to provide for interconnection of the fluid conduits on each vehicle.

Figure 15 of the drawings illustrates still another modification of the invention embodied in a trailer unit for rail operation in which the vehicle is supported on the novel pneumatic tired guide wheels, certain of these wheels bearing a regulated proportion of the load. The body supporting frame of the trailer vehicle may be of any desired type, for example like that described in connection with Figures 13 and 14 of the drawings. A coupling member 269, one of which is mounted at each end of the frame serves for connecting the trailer vehicle to a locomotive or in trains of similar vehicles.

An axle 271 provided with flanged pneumatic tired wheels 272 of the type previously described, is connected in supporting relationship to the truck frame 273 by means of a pair of springs 276. The vehicle frame is supported at one end on the truck at a swivelling connection 277 and the opposite end of the vehicle frame is supported in a similar manner by a duplicate truck.

Outwardly extending ears 279 and 281 adjacent each end of the axle 271 provide for pivotal connection of the arms 282 and 283 which are carried upon suitable pivot pins 284. An axle 286 is carried at the extremities of arms 282 and a similar axle 287 is carried by the arms 283. Flanged pneumatic tired wheels 288, similar to the wheels 272, are journaled for rotation on the axles 286 and 287.

To provide for distribution of a predetermined proportion of the load carried by the truck frame 273 on the axles 286 and 287, fluid cylinders 290 are provided. These cylinders are rigidly connected to the truck frame 273 and are disposed so that their piston rods or plungers 291 bear directly on the arms 282 and 283. Each of the arms 282 which carry the axle 286 and likewise each of the arms 283 which carry the axle 287 are thus operatively in contact with a piston rod 291 of one of the fluid cylinders 290.

In operation of the vehicle along the rails of a track, fluid under pressure is admitted to the cylinders 290 and the piston rods 291 bear against the arms 282 and 283 so as to transmit a portion of the load of the vehicle to the axles 286 and 287 and the wheels 288. It will be understood that suitable conduits are provided on the frame of the vehicle for conducting fluid under pressure from a convenient source to the fluid cylinders 290.

Figures 16 and 17 of the drawings illustrate a modified form of trailer vehicle employing rail guide wheels similar to those illustrated by Figures 1 to 4 of the drawings. This embodiment of the invention is adapted for highway and rail operation and is especially applicable to train operation of vehicles over routes composed partly of highways and partly of railway tracks.

The vehicle body frame 292 is supported adjacent each of its ends on axles 293 by springs 294 secured at spring seats on the axles. Spring mounting brackets 297 provide for proper connection of the springs 294 to the frame of the vehicle. The axles 293 are preferably of the automotive type to which the stub axles of the road wheels 299 are pivotally connected by means of king pins 301. The road wheels 299 are equipped with pneumatic tires 303 which may be of any type suitable for carrying the vehicle and its load.

Figure 6:
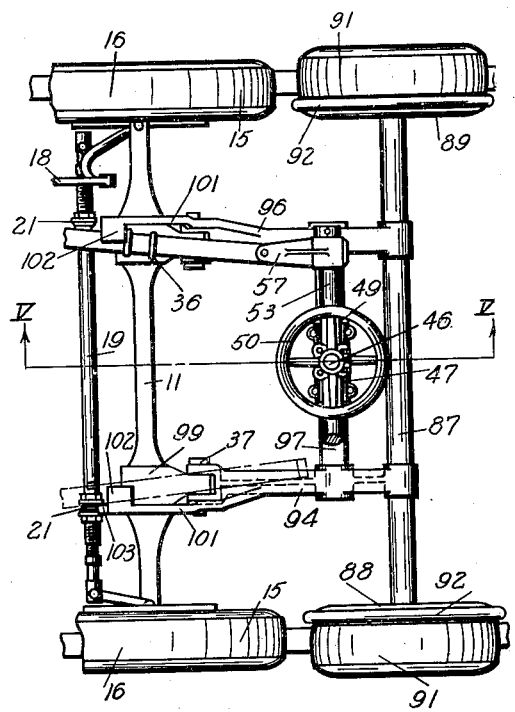
Figure 6 is a plan view of the apparatus of Figure 5.

The support for the rail guide wheels in this form of the invention is similar to that fully described and illustrated in connection with Figures 5 to 7 of my copending appplication Serial Number 613,751 filed May 26, 1932 to which reference may be had for a detailed disclosure. The rail guide wheels 306, similar in all respects to guide wheels 23 and 24 of Figures 1 to 4 of the drawings, are rotatably journalled on stub axles carried by the arms 307. Stationary discs or plates 309 carried by the stub axles of the road wheels 299 in the usual way are provided with supports 311 connected thereto by suitable fastening means. Supporting projections or ears 312 provide for pivotal connection in any suitable manner of the arms 307 to the supports 311. Bolts 314 in the arms 307 cooperate with the ends of the projections 312 so as to fix the limits of adjustment of the guide wheels with respect to the rails. Adjustment of the guide wheels is accomplished by means similar to that illustrated by Figures 10, 11 and 12. The oppositely threaded ends of the rod 208 are received in internally threaded members 315 and 317 pivotally carried by the supports 311. Each rod 208 is formed at one end to cooperate with a suitable tool or wrench.

A steering cross rod 318 joined at each end to steering arms 319 interconnects the steering road wheels 299 in a conventional manner. A draw bar 321 is pivotally connected to the frame 292 of the vehicle in any suitable manner at 322. A unitary part of the draw bar 323 beyond the point of connection 322 is joined by a link 324 to a steering arm 325. A similar steering cross rod is provided at the opposite end of the vehicle. Swinging movements of either draw bar 321 about its pivot will move the stub axles of the wheels 299 to steer the vehicle.

For highway travel of the vehicle just described, the guide wheels 306 are raised to clear the running surface of the road wheels 299 by manipulating the rods 208. Where a plurality of the vehicles are connected in a train, coupled together by means of the draw bars 321, each vehicle will follow substantially in the path of the preceding vehicle. If desired, the steering mechanism for the wheels at each end of the vehicle may be interconnected, for example, by means of a suitable link pivotally joined to the parts 323 of the draw bars at each end of the vehicle. For rail travel, the guide wheels are lowered until their peripheries clear the rail by a slight amount. Intermittent contact of the guide wheel flanges with the inside of the rail heads serves to keep the vehicle on the rails.

For operation of the trailer vehicle of Figures 16 and 17 in a self propelled train composed of two or more units, one or both of the axles 293 of the vehicle may be replaced by a driving axle of the type which imparts driving power to the steerable road wheels through flexible connections. An internal combustion engine or a motor receiving its power from a remote source can be used to drive the vehicle wheels through the mechanism of the driving axle. A train composed of such power driven vehicles or trailer and power driven vehicles in any desired combination may be operated over highways and on the rails of a track. The drive units of the power driven vehicles may be controlled from a single station conveniently located in the train.

Figure 18 of the drawings illustrates a modified form of the vehicle just described in connection with Figures 16 and 17, employing the novel pneumatic tired guide wheels previously described. The guide wheels 326 are carried by arms 307 pivotally connected to the member 312 as described in connection with Figures 16 and 17. The axle 293 upon which the body carrying frame of the vehicle is supported may be of the idle or driven type. Adjustment of the position of the pneumatically tired guide wheels is accomplished by turning the threaded rods 208 and in rail operation, the guide wheels may be lowered to carry a predetermined portion of the load.

Figures 19 and 20 of the drawings illustrate a modification of the invention wherein an auxiliary truck is provided to carry the rail guiding wheels. This auxiliary truck, designated generally by the reference character 329 is adapted for attachment to a motor vehicle, and in the embodiment illustrated is provided with means for adjustably securing it to the vehicle axles.

A portion of a conventional vehicle is shown comprising a front axle 331 and a rear driving axle 332. The pneumatic tired road wheels supporting the front axle are adapted to be steered in the usual manner through a steering link 334 and a steering cross rod 336 which interconnects the two road wheels of the axle 331. The rail guide wheels carried by the forward portion of the truck 329 are connected to the steering cross rod 336, in a manner to be described, to steer the vehicle road wheels along the rails of a track.

The frame of the auxiliary truck 329 comprises a pair of longitudinal frame members 338 formed of metallic tubing or other suitable material. These members are welded or otherwise suitably joined to tubular end frame members 339 and 341. The member 341 serves as an axle upon which are journalled a pair of rear guide wheels 342. The forward pair of guide wheels 343 are journalled on an axle 344 which is slidably housed in the tubular member 339 of the truck frame. Coil springs 346 surround the axle 344 between shoulders 347 formed on the axle and the ends of the tubular member 339. These springs act outwardly against the shoulders 347 and serve normally to position the axle within the tubular frame member so that the forward guide wheels 343 are carried in front of the vehicle wheels. As the guide wheels on the axle 344 encounter a curve in the track rails, the entire axle is shifted laterally. This shifting movement is yieldingly resisted by the spring 346 on the side opposite to the direction of curvature.

The road wheels on the vehicle are steered by movements of the guide wheel axle 344 imparted by the cables 349 and 351 to the steering cross rod 336. The cables are guided for movement in cable sheaths 353 secured to the frame members of the auxiliary truck. An elongated slot 354 in the frame member 339 accommodates a pin 356 which is secured to and moves with the axle 344. The cables 349 and 351 are connected at one end to the pin 356 and at the opposite end to the steering cross rod 336 by means of an adjustable fitting 357 similar to fitting 141 described in connection with Figure 9. It will be seen that as the axle 344 moves laterally when a track curve is encountered, movement of the pin 356 will exert a pull on one of the cables depending on the direction of curvature to move the steering cross rod to turn the vehicle wheels in the direction of the curve.

To provide for highway operation of the vehicle, the auxiliary truck is pivotally secured to the vehicle axles 331 and 332 by means of suspension links 358 and 359 pivoted at one end to the truck frame. The forward pair of links 358 are detachably secured to the axle 331 by fittings which comprise a body portion 361 and a clamping member 362. In applying these fittings to the axle, a groove in the body portion 361 is engaged over the lower flange of the axle and the clamping member which is provided with a similar groove, engages the opposite side of the axle flange. A clamping bolt 363 serves to hold the body portion and the clamping member of each fitting in clamping engagement with the axle. The rear pair of suspension links 359 are pivotally connected to fittings which are welded or otherwise secured to the rear vehicle axle 332.

A hand lever 364 pivotally connected to the vehicle frame (not shown) in any convenient location by means of a pivot pin 366 serves to raise the auxiliary truck from its rail guiding position to allow for highway operation without interference from the rail guide wheels or the frame. Cables 368 and 369 are connected at one end to the truck frame near the points of pivotal connection of the links 358 and 359. The opposite end of each cable is connected to an extended portion 371 of the hand lever 364. Movement of the hand lever 364 to the left as viewed on Figure 19 will raise the auxiliary frame to a position indicated by the dot and dash lines. A quadrant 372 in cooperation with a latching pawl serves to retain the auxiliary truck in raised position.

In rail operation of a vehicle equipped with the guiding truck just described, the hand lever is moved to the position shown on the drawings whereupon the auxiliary truck frame swings downwardly until the treads of the guide wheels are just clear of the rails. Assuming that a curve to the right is encountered, the guide wheel axle 344 is moved to the right by contact of the flange of the left hand guide wheel with the rail. This movement is imparted to the steering cross rod 366 by the cable 351. The road wheels are turned on their steering pivots to follow the direction of curvature of the track. When a curve to the left is encountered, the guide wheel axle 344 moves to the left to exert a pull on the cable 349. On tangent tracks, the guide wheels engage the rails intermittently to constrain the vehicle to follow the rails.

When the vehicle is to be operated on the highway, the hand lever 364 is moved to the left as previously explained, raising the truck frame until the side frame members 338 thereof lie in contact with the axles of the vehicle. This change is accomplished instantaneously from the driver's seat. The slack in the steering cables 349 and 351 permits steering control of the forward vehicle wheels in the usual manner.

Figures 21 and 22 of the drawings illustrate a modification of the invention wherein an attachment for converting a road vehicle for rail travel is controlled by fluid operated means to permit rapid change from highway to rail operation and vice versa. Referring to these figures, numeral 376 indicates an axle of a conventional road vehicle supported by a road wheel 378, only one of which is shown. The axle chosen for the purpose of illustration is of the non-steering type of driving axle, however, it will be understood that the attachment about to be described is adapted for use in connection with the pneumatically tired road wheels on any type of vehicle axle. The support 379 for the rail guide wheels is similar to that described in connection with the embodiment of Figures 16 and 17 of the drawings. This support is secured in a suitable manner on a stationary member carried by the axle 376. The rail guide wheels 382 are also like those illustrated by Figures 16 and 17, and are rotatably journalled on stub axles 383 carried by the arms 384. The arms 384 are pivotally connected by bolts 386 to supporting projections on the support 379 and extend upwardly beyond the point of pivotal connection as indicated by the reference numeral 387. A fluid cylinder 388 is pivotally connected by a rod 389 to one of these extensions and a piston rod 392, cooperating with a piston in the cylinder is pivotally connected at its free end to the extension 387 of the remaining arm. A spring 394 connected between the extensions of the arms 387 serves to draw them together when fluid is exhausted from the cylinder 388.

Upon admission of fluid under pressure to the cylinder 388, the extensions 387 are spread apart and the guide wheels are lowered to rail guiding position. The limits of movement of the arms 384 are fixed by screws 396 which cooperate with stops 397 on the arms. It will be understood that the cylinder 388 may be of the double acting type or may be operated by vacuum. In this latter case, air at the pressure of the atmosphere will be admitted behind the piston and a suitable gland or stuffing box will be provided for the piston rod 392.

The mode of operation of the rail guiding attachment just described will be readily understood by reference to the description accompanying Figures 16 and 17 of the drawings. When the vehicle is to be used for highway travel, the spring 394 maintains the guide wheels in their raised or inactive position. If at any time it is desired to travel on the rails of a track, fluid is admitted under pressure to the cylinders 388 under control of a suitable valve conveniently positioned for manipulation by the operator of the vehicle. The rail guide wheels are lowered until their treads are just clear of the rails. The desired position of the guide wheels in operation may be selected by adjusting the screws 396. As previously stated, the guide wheel flanges are so spaced with respect to the sides of the rail heads that they contact only intermittently therewith. In the event of deflation of one or more of the tires of the vehicle, the guide wheels will be in position to support the vehicle axle. Fluid operation of the guide wheel positioning arms permits a quick change from highway to rail travel without necessity for the operator to dismount from the vehicle.

The present invention in the several modifications disclosed herein will be seen to present a means for transportation of goods and passengers in single vehicles or trains of vehicles over routes including streets and highways and the rails of existing steam or electric lines. The preferred form of the present invention for moving freight employs the novel pneumatic tired guide wheels disclosed herein. The novel vehicles of the present invention adapted for trailer operation have a capacity which is greatly in excess of the capacity of conventional road vehicles. Single units can be used for door to door pick up of goods and passengers after which the units can be assembled in a train and moved on highways and tracks to a point convenient to the final destination of each of the vehicles composing the train. From this point the single units can be operated individually to effect door to door delivery.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A road and rail vehicle comprising a body supported adjacent each end thereof by a truck having a swivel connection with said body, load bearing wheels having a resilient tread supporting said truck, and rail guiding means connected to said truck comprising guiding wheels in substantial alignment with said load bearing wheels having a resilient tread for load bearing engagement with the top of the rail and a guiding flange for cooperation with the side of the rail, said guiding wheels being disposed in proximity to said load bearing wheels, and means for moving said guiding means to and from rail guiding position and varying the load on said guiding wheel.

2. A road and rail vehicle comprising a body, a truck adjacent each end of said body comprising a frame, a body supporting member spring mounted on said frame, a swivelling connection between said member and said body, load supporting wheels having a resilient tread on an axle sustaining said frame, retractable guide means supported from said frame comprising flanged pneumatic tired guide wheels in substantial alignment with said load supporting wheels for guiding and load bearing contact with the rails, and means for moving said guide means to and from rail guiding position and varying the load on said rail guide wheels.

3. A road and rail vehicle comprising a body supported adjacent each end thereof by a truck having a swivel connection with said body, an axle interconnected with the frame of said truck by springs, load supporting wheels having a resilient tread on said axle, retractable guide means supported from said frame comprising flanged pneumatic tired guide wheels in substantial alignment with said load supporting wheels for guiding and load bearing contact with the rails, and fluid operated means for moving said guide means to and from rail guiding position and regulating the load on said rail guide wheels.

4. A highway and rail vehicle for operation on track rails comprising steerable road wheels, and means for steering said wheels, guide means supported from said vehicle for movement to and from rail guiding position, and means movable with said guide means for engaging said steering means and locking the same against movement when the guide means are moved to rail guiding position, said steering means comprising a movable rod member, a stop on said member, and the said means for preventing steering movement of said road wheels comprising an arm supporting said guide wheels and engageable at one end with said stop.

WILLIAM B. FAGEOL.